April 19, 1966 V. J. SIGODA ETAL 3,246,620
COMPOUND STITCHING DEVICES
Filed July 18, 1960 12 Sheets-Sheet 1

Fig. 1.

INVENTORS
VICTOR J. SIGODA
JERRY SIGODA
MERTON A. SIGODA
BY Jacob J. Bobrow
ATTORNEY

INVENTORS
Victor J. Sigoda
Jerry Sigoda
Merton A. Sigoda
BY Jacob J. Bobrow
ATTORNEY April 19, 1966    V. J. SIGODA ETAL    3,246,620
COMPOUND STITCHING DEVICES
Filed July 18, 1960    12 Sheets-Sheet 6

INVENTORS
Victor J. Sigoda
Jerry Sigoda
Merton A. Sigoda
BY Jacob J. Bobrow
ATTORNEY

April 19, 1966   V. J. SIGODA ETAL   3,246,620
COMPOUND STITCHING DEVICES

Filed July 18, 1960   12 Sheets-Sheet 8

INVENTORS
VICTOR J. SIGODA
JERRY SIGODA
MERTON A. SIGODA
BY Jacob J. Bobrow
ATTORNEY United States Patent Office 3,246,620
Patented Apr. 19, 1966

3,246,620
COMPOUND STITCHING DEVICES
Victor J. Sigoda, Great Neck, Jerry Sigoda, Bronx, and Merton A. Sigoda, Roslyn Heights, N.Y., assignors to Man-Sew Corporation, New York, N.Y., a corporation of New York
Filed July 18, 1960, Ser. No. 43,513
19 Claims. (Cl. 112—162)

This invention relates to sewing machines for producing compound stitching and more particularly to an attachment which can be mounted on conventional single needle sewing machines of either the lockstitch or chainstitch type to convert such machines for the production of such compound stitching.

The type of compound stitching which is produced by the device which is described hereinafter is commonly found on the inside of men's trousers, in which each leg portion is joined by two longitudinal seams. Trousers are more usually made of soft woolen fabrics, which when cut, have free filaments of thread along the cut edge. It is desirable for the comfort of the wearer to confine these filaments and this is commonly done by overcasting or overedging the cut longitudinal edges, each edge being done separately. After both longitudinal edges of each ply are overcast in an overedging machine, both plies are brought together, and one superposed on the other and a joining seam spaced inwardly from the overcast edges is sewn, usually in a lockstitch type of machine, but it is not uncommon to use a chainstitch type of sewing machine for the purpose as well. Thus, as now practiced, three separate sewing operations are required for each seam.

It has been proposed in Patent No. 2,448,495 to produce such compound stitched seams in only two separate and sequential sewing operations by first overcasting one ply edge in accordance with the prevailing practice and by then joining this overcast ply with the other unsewn ply in a safety stitch sewing machine which simultaneously overcasts the unsewn ply edge as the join seam is sewn. This has been shown in Patent No. 2,973,730 to Schweda et al., using a pair of offset lines of two thread chainstitching as the joining seam with either two, three or four thread edge overcasting of the ply which is overedged as the join seam is sewn.

It is not necessary that the join seam be a chainstitch type of either the single or offset pair variety. It may be a plain lockstitch seam sewn concurrently with the overcasting of the second ply edge. Mechanism whereby this may be done is disclosed in Sigoda Patent No. 2,973,731.

This disclosure however, relates to mechanisms for producing such trouser leg seams in but a single sewing operation in which as the join seam is being sewn, simultaneously, each ply edge, in sequence, is separately overcast. Basically, this involves providing a second overedging instrumentality or station in a safety stitch device such as that shown in the Sigoda patent together with means for keeping the ply edges separate from each other and each ply edge, in turn, away from the active region of the overedging station which overcasts the edge of the other ply. In the mechanisms shown and described herein, the top ply is overcast in the front overedging station as the under ply is bent out of the way, and the under ply is overcast in the rear overedging station as the upper ply is bent out of the way. It is a matter of choice which ply is overcast at the front station and which at the rear station, it being understood that one ply must be directed out of the path of the overedging station which overcasts the edge of the other ply.

It is also a matter of choice whether either ply in being diverted, is bent downwardly or upwardly or laterally, so long as the net result is to divert the ply from the region of activity of the overedge station that overcasts the other ply. For example, instead of the arrangements shown herein, the upper ply could be directed upwardly at the front overedge station, or bent back upon itself in a reverse fold, until it passed the front station at which the lower ply would be overcast, and then the upper ply could be led back to its original horizontal position at the rear overedge station at which the edge of the upper ply would be overcast while the overcast edge of the under ply would be led or bent downwardly out of the path of the upper ply overedging elements. This could be accomplished with the spirally twisted tongue which is utilized in the versions shown herein to direct the upper ply out of the path of the rear overedge station, being bent downwardly to carry the lower ply out of the path of the upper ply overedging instrumentalities. The versions shown are presently preferred because they offer better visibility of the work as the stitching proceeds, and eliminate the problem of an enlarged overcast edge being led under the plate and the friction resulting therefrom.

In the drawings:

FIG. 6 is an exploded detail view looking toward the head end of the machine from the operator's left showing the relative arrangement of the needles, the foot, the needle-plate, and the feed dog which operates therethrough;

FIG. 16 is a detail view, in perspective, similar to FIG. 1 of a second version of the device, showing the plies joined together in the form of a flat topstitch seam which requires no ironing after it leaves the sewing machine;

The devices disclosed herein are modifications of the overedging attachment of the said Sigoda patent and will be described in conjunction with that disclosure. Briefly, that attachment consists of a housing 35 which contains mechanisms which convert rotary power derived from a drive source in the sewing machine to timed oscillations of rockshafts 52, 61 and 85 which respectively operate the primary looper 51, the secondary looper 60, and the movable cutter 96.

The housing is installed on a standard lockstitch sewing machine which has been modified by being provided with a dual needle holder 16 which permits the overedge needle 100 to be reciprocated with the lockstitch needle 12; and with a modified feed dog 13 and needle-plate 98. More complete constructional and operational details will be found in the Sigoda patent.

In the version of the modification of that attachment shown in FIGS. 1 to 15, the dual needle holder 16 is replaced by a triple needle holder 216 which makes it possible to reciprocate two overedge needles 100 and 200 along with the lockstitch needle 12. Feed dog 13 is replaced by a new feed dog 213 which has longer runners 316 which are relieved on the underside at 318 to provide a passageway transversely under the working surface of the runners for the lateral shifting of two primary loopers 251 and 253. Presser foot 14 is replaced by a new presser foot 214 which retains the clearance hole 114 for the lockstitch needle 12, but is provided with a longer cutout section 215 for passage of the front overedge needle 100 and for the front secondary looper 260 which passes upwardly across the edge of the upper ply as its edge is overcast. Relief 217 at the rear of the foot serves the same purpose for the passage of rear overedge needle 200 and secondary looper 262 as the lower ply edge is overcast. Presser blade 218 soldered to the top surface of the foot exerts downward pressure on the top ply to hold it down to prevent floating as the latter approaches the front overedge station, and the curved upright wall 219 at the rear of the foot guides the overcast top ply edge out of the path of the rear overedge station.

Primary looper shaft 52 now carries two looper holders 250 and 252, each of which is provided with a clamp portion at its lower free end adapted to retain the tang of the front primary looper 251 and the rear primary looper 253 respectively. Secondary looper shaft 61 now carries secondary looper holders 259 and 261 which respectively support the front secondary looper 260 and the rear secondary looper 262. For the purpose of overcasting ply edges in trousers seams, two thread overedging is commonly accepted as being suitable, and accordingly, the secondary loopers shown are of the thread intercepting type rather than of the threaded type used with three thread overedging, which could be substituted, if desired.

The operation of the lockstitch needle and its rotary hook beneath the feed dog is well known and requires no further description. It is apparent that in lieu of a lockstitch, that either a single thread or two thread chainstitch might be used instead, and there has been disclosed in Sigoda U.S. Patent No. 3,121,413, an attachment for the overedging device shown in the mentioned Sigoda patent which permits conversion of such machines for two thread chainstitching.

The operation of either overedge needle 100 or 200, and its corresponding primary and secondary loopers, is substantially as disclosed in the said Sigoda patent, allowance being made for two thread overedging instead of the three thread overedging described therein. This variation is of course well understood in the art and requires no further comment.

Figure 5:
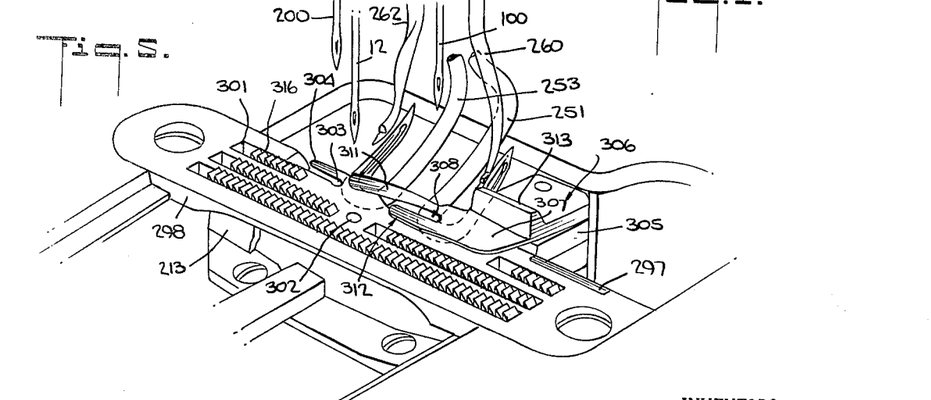
FIG. 5 is a view similar to FIG. 3, but with the presser foot removed so that the details of construction of the needle-plate may be seen more clearly.
Figure 7:
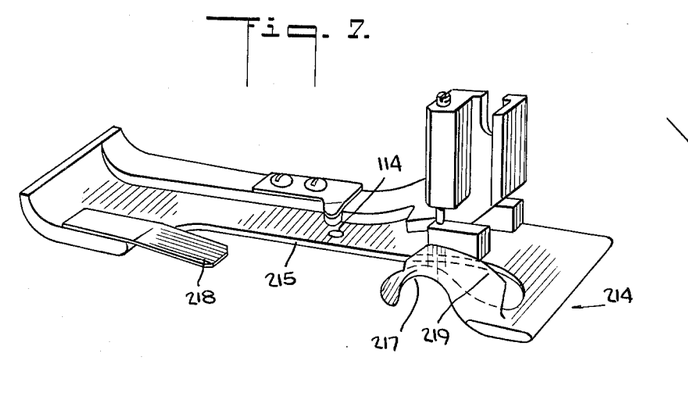
FIG. 7 is an exploded detail view looking from the direction opposite to that of FIG. 6 showing the other side of the foot and the needle-plate, and in phantom, the manner in which the two plies rest on the needle-plate and how the upper ply follows the spiral twist of the stitch tongue.

The novelty inheres in the manner in which the ply edges are separately overedged without both plies being bound together by the overedging. This is accomplished in this particular version as follows. Referring to FIGS. 5 and 6, it will be seen the replacement needle plate 298 is constructed quite differently than the needle-plate 98 of the Sigoda patent. It is similarly provided with longitudinal slots 301 to accommodate runners 316 of feed dog 213 and with a clearance hole 302 for the lockstitch needle 12.

It is also notched for the stationary cutter blade 297 and provided with means for mounting the latter, and has a rear needle hole 303 communicating with a slot adjacent the rear stitch tongue 304, in which respects it is also similar to the Sigoda needle-plate 98. Stitch tongue 304 also functions to support the edge of the work, in this instance, the underneath ply, in the course of the formation of overedge stitching about the edge of the ply and around the stitch tongue, which as in the case of the Sigoda stitch tongue 104, is also tapered on the underside to facilitate pulling off of the formed overedge stitch as the feed moves the work rearwardly.

Figure 4:
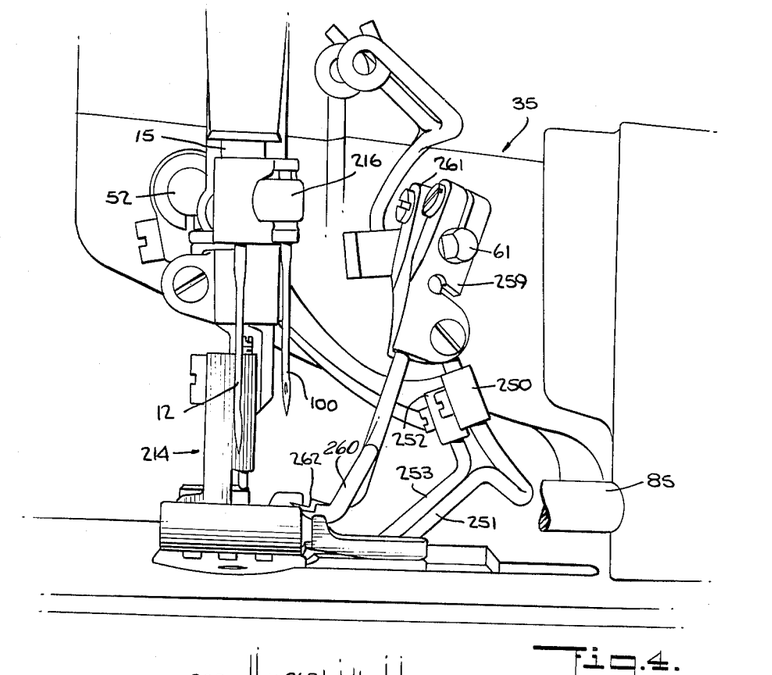
FIG. 4 is a front elevational view corresponding to FIG. 3 with the oscillating cutter removed for clarity.

Needle-plate 298 differs markedly however in that at its forward portion, provision for the front overedge station is made. Just to the rear of the notch for the cutter blade 297, it is provided with a leftwardly curved relief 299 having a tapered edge 300 (FIG. 10) and a rightwardly laterally extending projection 305 (FIG. 4). Projection 305 supports a combined front overedge station stitch tongue and lower ply edge deflecting member 306 which has a platform section 307 which extends rearwardly in spaced relation above the surface of needleplate 298 when member 306 is mounted on projection 305. Platform 307 is divided by a slot 308, the closed end of which is rounded off in alignment with a vertical groove 309 in a projection 310 which extends downwardly from the undersurface of platform 307. The end of slot 308 and groove 309 serve as a passageway for overedge needle 100.

The right hand projection of platform 307 (FIG. 4) is a spirally twisted tongue 311 about which the overcasting forms in the edge of the upper ply (FIG. 5). The left hand projection 312 serves as a support for the upper ply as the edge is being overcast. Member 306 also has a vertical wall 313 which is in alignment with the shear edge of blade 297 and along which the trimmed edge of the upper ply is guided to the overedging elements.

Tongue 311 is horizontally disposed at its connection with platform 307 but the twist of tongue 311 proceeds in a counter-clockwise direction so that the rear end is disposed almost vertically, inwardly and to the left of needle hole 303, when member 306 is mounted on projection 305. Tongue 311 which has a slight taper as it extends to the rear, supports the trimmed edge of the upper ply as the overcasting produced by the interaction of needle 100, primary looper 251 and secondary looper 260, forms in the edge of the upper ply about tongue 311, binding this overcast ply edge to the tongue. As the feed action of the sewing machine draws the plies rearwardly, the bound edge of the upper ply follows the spiral twist of tongue 311 from a horizontal position to a vertical position to the left of needle hole 303, out of the path of the rear overedge elements.

This avoidance of the rear overedge station is aided by the contour of wall 219 at the rear of the foot (FIG. 5) which takes over after the overcast top ply edge leaves the rear end of the tongue 311 and maintains this ply edge in a vertical position until after it safely passes the path of needle 200. Wall 219 is shaped so that not only does it physically separate the upper ply from the lower ply as the latter is being overcast at the rear station, but it also permits the upper ply, once past the rear station, to pass beneath the undersurface of the foot at the rear so that the feed action may withdraw both overcast plies from the overedge stitching stations (see FIG. 10).

Figure 8:
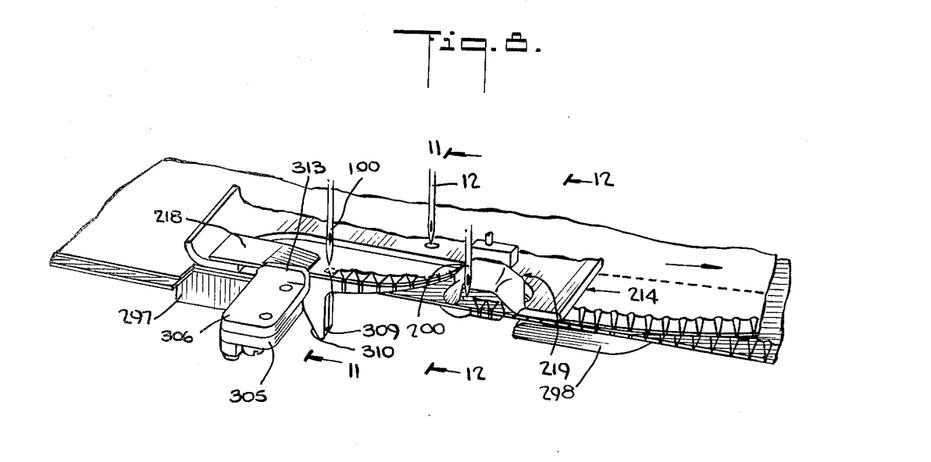
FIG. 8 is a detail view, in perspective, taken from the same direction as FIG. 7, showing the foot in position on the needle plate and particularly how the upper ply travels to avoid the rear overedge station.
Figure 9:
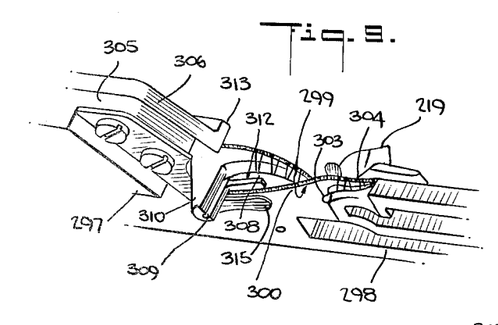
FIG. 9 is a detail view, in perspective, of the underside of the parts shown in FIG. 8, showing fragmentary portions of the foot and needle-plate and how the lower ply is guided out of the path of the front overedging station and how the overcasting forms about the edge of the lower ply at the rear station.
Figure 10:
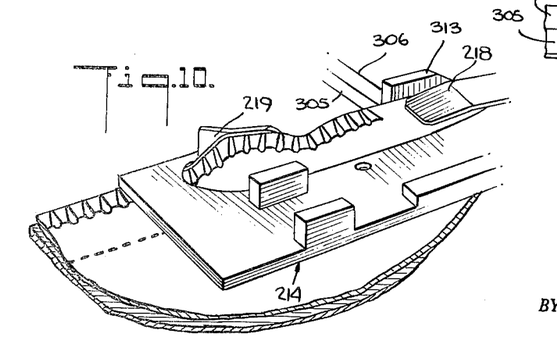
FIG. 10 is a fragmentary view, in perspective, taken from the direction opposite to that of FIG. 8, showing how the upper ply is guided to avoid the rear overedge station by the vertical wall at the rear of the presser foot after the stitched edge leaves the twisted spiral of the front stitch tongue.
Figure 11:
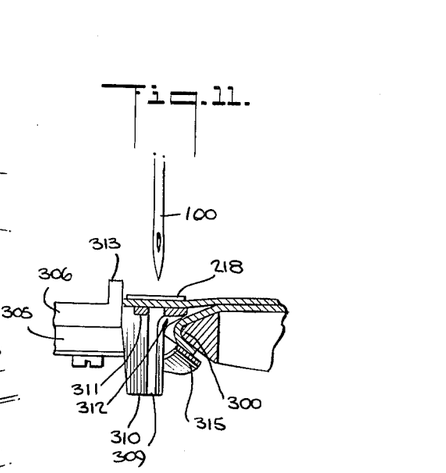
FIG. 11 is a cross sectional view taken on line 11—11 of FIG. 8 showing how the under ply is folded down and away from the active region of the front overedge station.
Figure 12:
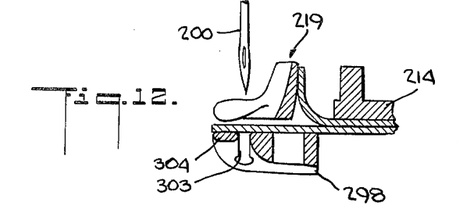
FIG. 12 is a cross sectional view taken on line 12—12 of FIG. 8 showing how the upper ply is bent away from the active region of the rear overedge station.
Figure 13:
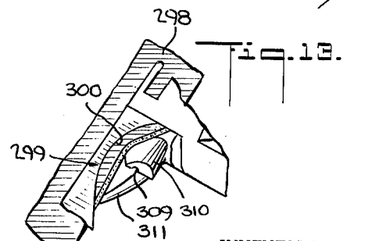
FIG. 13 is a fragmentary view, in perspective, of the underside of the needle-plate, with the ply edge protecting member removed, taken from the direction opposite to that of FIG. 9, showing the shape of the depending projection and the mating relief on the needle-plate and how the guide channel is formed between them to bend and divert the lower ply edge.

As the upper ply is being overcast at the front overedge station, the lower ply is being directed out of the path of needle 100 and its associated loopers. This is accomplished, as best seen in FIGS. 11 and 13, because a guide channel is formed between the downwardly extending projection 310 on the undersurface of platform 307 and the tapered horizontal edge 300 of the relief 299 along the edge of the needle-plate. The forward wall of projection 310 is contoured adjacent its connection with the undersurface of platform 307 so that the lower ply edge inserted beneath platform 307 is bent downwardly and almost vertically away from the needle groove 309 in which needle 100 reciprocates, being shielded therefrom by the wall surrounding the needle groove. In this attitude, the edge of the lower ply might extend downwardly into the path of the tip of primary looper 251 and might be frayed on contact, hence guard 315 is provided to curl the edge of the lower ply out of this path (FIG. 8).

The shape of this guide channel for the lower ply is contoured so that after the bent ply edge passes projection 310, it may return to the horizontal position to pass over the tapered edge 300 in proper attitude for overcasting as it nears the rear overedge station.

Figure 14:
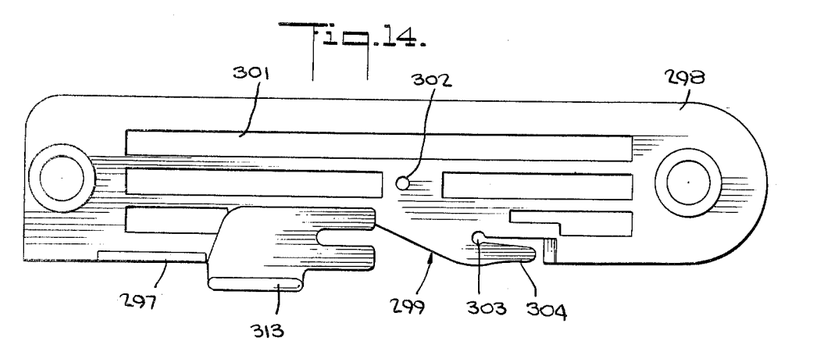
FIG. 14 is a plan view of a variation of the needle-plate and FIG. 15 is a plan view of a variation of the presser foot in which certain parts of the original needle-plate have been transferred to the presser foot as a modification of the first version.
Figure 15:
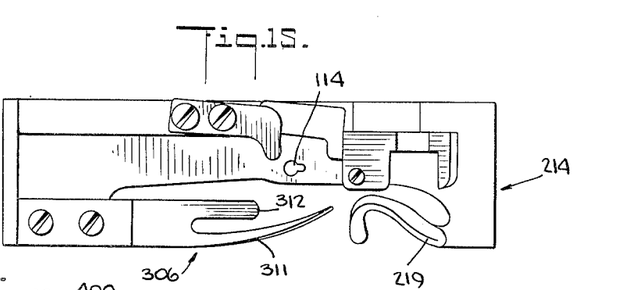
Figure 17:
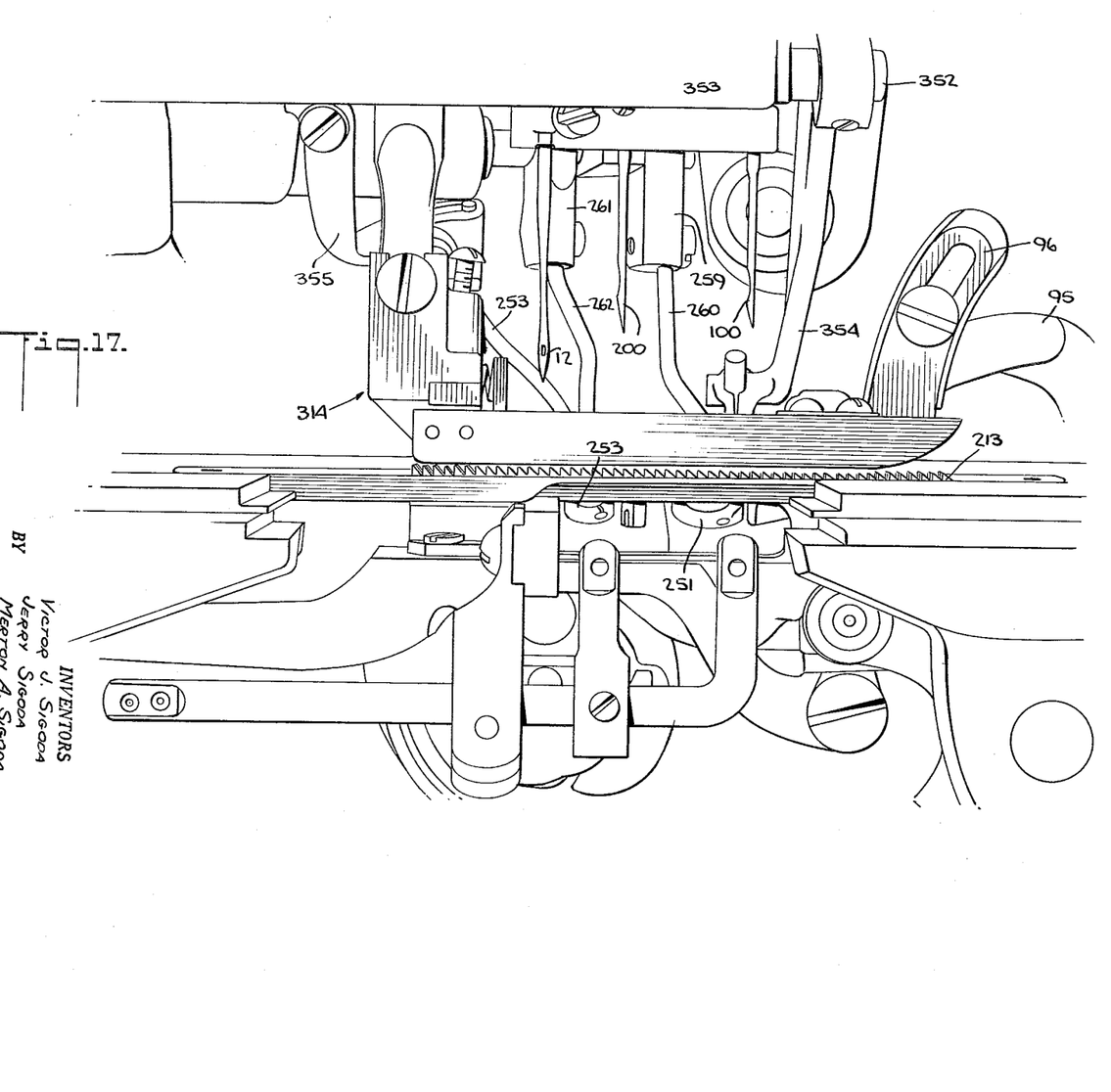
FIG. 17 is an end view of the device shown in FIG. 16, showing the relative arrangement of all the needles.
Figure 18:
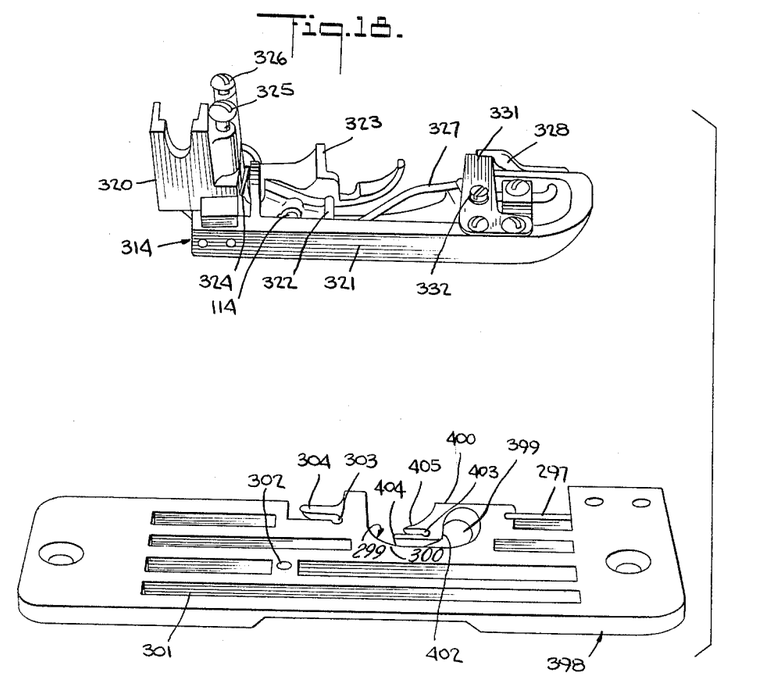
FIG. 18 is an exploded view showing the presser foot and needle-plate of the second version in relative operating position, looking toward the head end of the machine.

In FIGS. 14 and 15, a variation of this first version is shown in which member 306 is supported by the foot instead of the needle-plate. In this arrangement, projection 305 is omitted from plate 298 and member 306 is mounted on foot 214 in the same relative position, with projection 310 lengthened sufficiently to maintain the same relationship with tapered edge 300 of relief 299 to provide the guide channel for the lower ply.

A second version is shown in FIGS. 16 to 24. This version differs mainly in the arrangement of the stitching stations so that both overedge stations are positioned in advance of the join seam station, and in the redistribution of certain functions of portions of the needle-plate and the presser foot of the first version.

Primary looper shaft 52 of the Sigoda patent is replaced by a lengthened shaft 352 which is supported at its forward end by an outrigger arm 353 which is attached to the housing 35. Front primary looper carrier 354 is attached to shaft 352 to oscillate with it and to carry front primary looper 251 clamped thereto, which as previously, continues to cooperate with front overedge needle 100 and front secondary looper 260. Rear primary looper carrier 355 is also attached to shaft 352 and carries the rear primary looper 253 clamped thereto, and the latter also continues to cooperate with rear overedge needle 200 and rear secondary looper 262.

Needles 100 and 200 are carried by a different form of triple needle holder 416 which positions both overedge needles forwardly of the lockstitch needle 12, and as before, to the right thereof.

Needle-plate 398 differs from needle-plate 298, although it also has longitudinal slots 301 for runners 316 of the feed dog, the clearance hole 302 for lockstitch needle 12, the notch for the stationary cutter blade 297, the rear overedge needle hole 303 communicating with a slot adjacent stitch tongue 304, and the leftwardly curved relief 299 with the tapered edge 300. Projection 305 is omitted because the functions of member 306 are now taken over by other portions of needle-plate 398 and the new type presser foot 314.

Needle-plate 398 is provided with a rounded aperture 399 which is formed between the tapered edge 300 of relief 299 and a projection 400 which extends to the right beyond the shear edge of cutter blade 297 with a portion 401 extending downwardly below the surface of plate 398. The forward slope of this downward projection 401 is contoured in a manner similar to that of the forward wall of projection 310 of member 306 of the first version, and serves the same purpose of guiding the lower ply edge away from the path of the front overedge elements. A knife edge 402 is formed at the rear of aperture 399 at the junction of the top surface of needle-plate 398 and the upper end of the slope of projection 401, and this knife edge which is disposed across the line of stitching, in conjunction with a new active element on the presser foot effects the separation of the upper and lower plies, and it is under this knife edge that the lower ply passes to be bent away by the contoured slope of projection 401.

Plate 398 has a needle-hole 403 disposed rearwardly of aperture 399, a short extension 404 on the left of the needle-hole which supports the upper ply as the overcasting of the edge progresses, and a short stitch tongue 405 disposed to the right of the needle-hole and with a decided taper to the rear. Extension 404 has attached to it a guard shelf 406 which curls the edge of the lower ply so that it cannot project into the path of movement of the tip of primary looper 251 and which corresponds in function to guard member 315.

Figure 1:
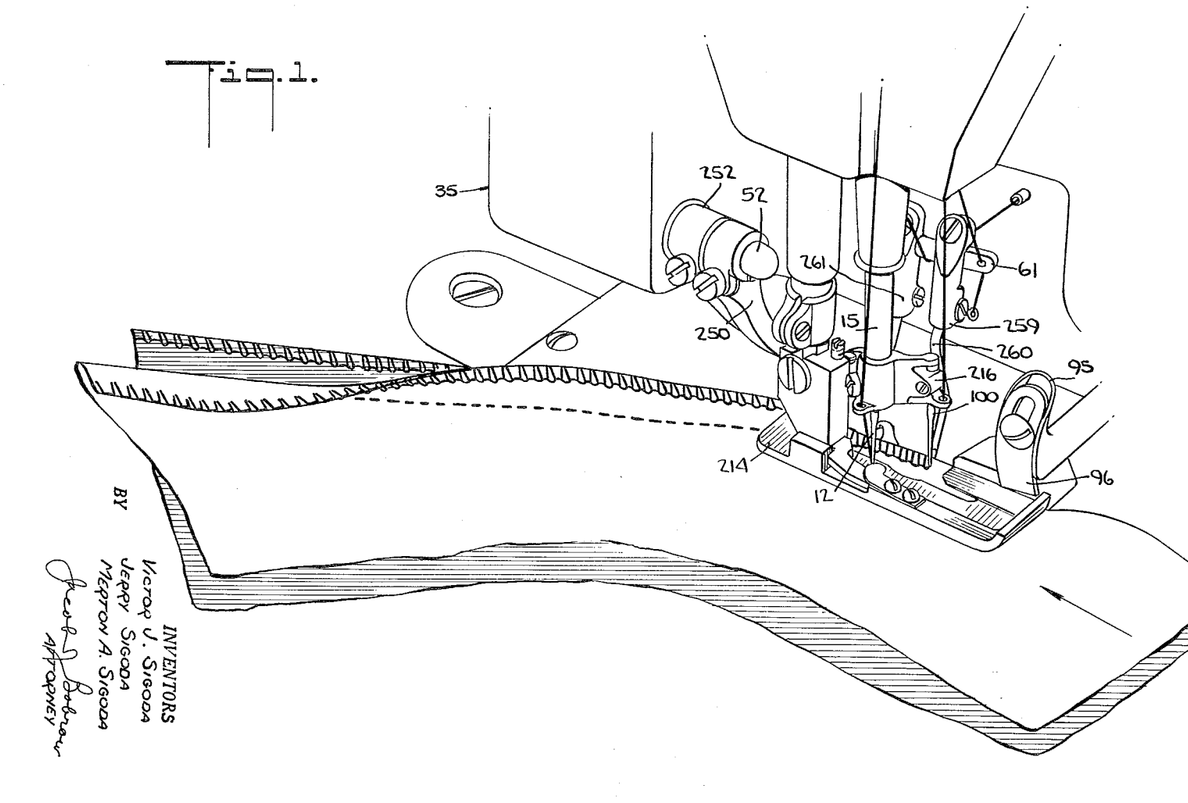
FIG. 1 is a detail view, in perspective, of the significant portions of one version of a modified form of the overedging attachment shown and described in the mentioned Sigoda patent, showing the general arrangement of the active elements and the joined and overcast plies of one longitudinal seam of a pair of trousers as it emerges from the machine, the plies being joined in a simple seam which requires ironing to press the plies open and flat.
Figure 2:
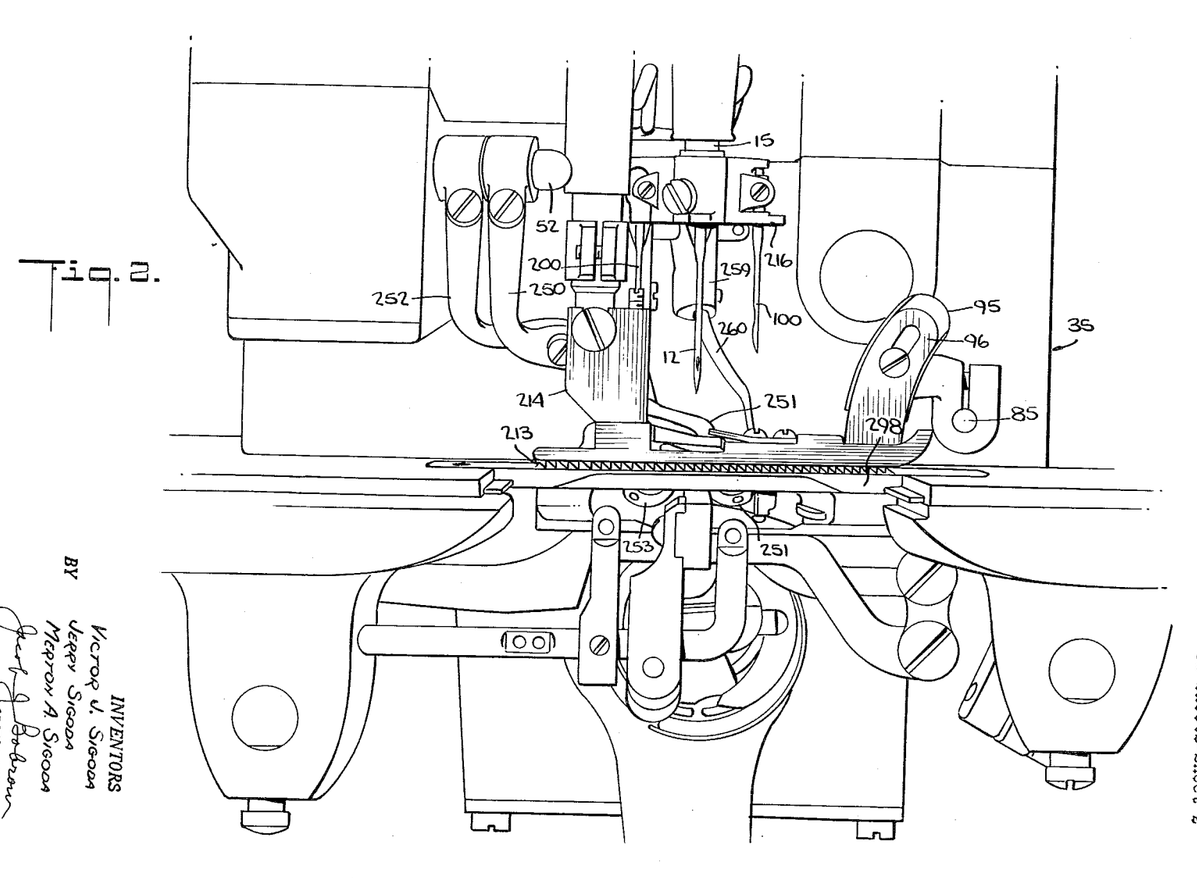
FIG. 2 is an end elevation taken from the needle head end of the machine of the device shown in FIG. 1.
Figure 3:
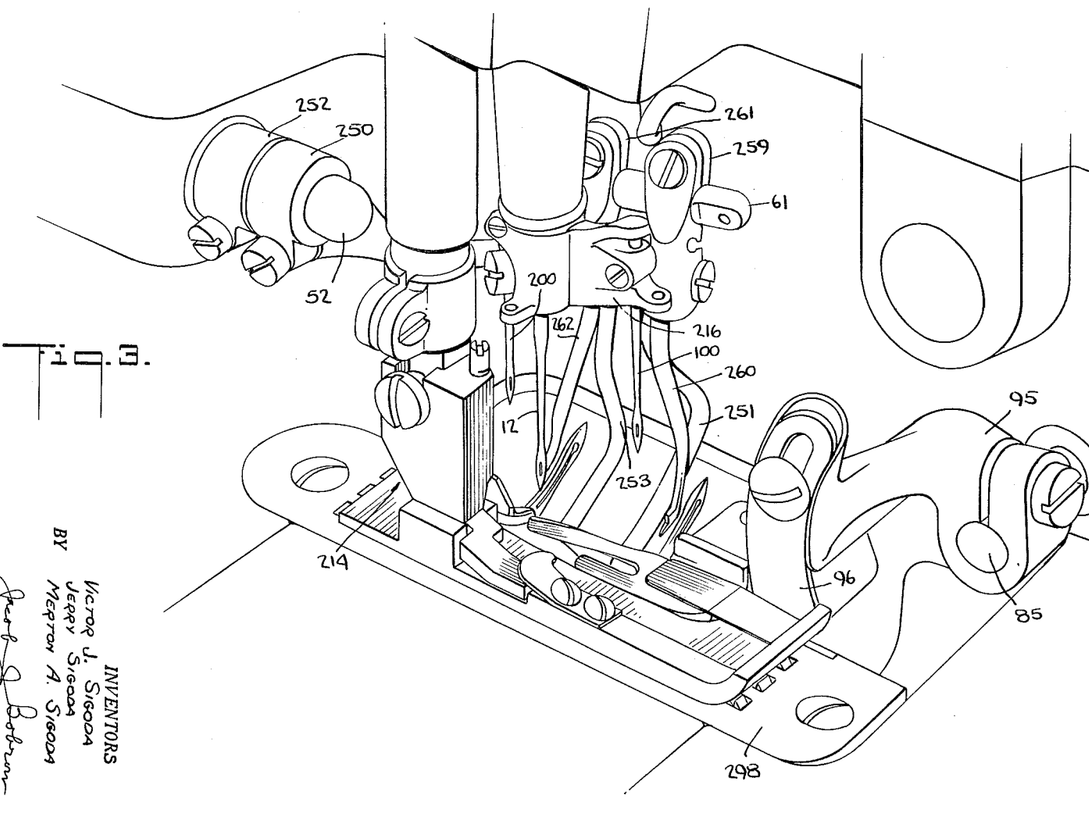
FIG. 3 is an enlarged detail view of a portion of the device shown in FIG. 1, with the work removed, showing the join seaming needle, one overedge station positioned in front of and the other overedge station positioned at the rear of the join seaming needle; the special presser foot, and particularly the spirally twisted tongue portion of the needle-plate at the front overedge station.

The new presser foot 314 is shown as being of the split, compensating shoe type which is useful when making the seam shown in FIG. 16, although the foot need not be of this type if the seam shown in FIG. 1 is produced. In the latter type, since the plies which are superposed for the stitching operations enter and leave the stitching stations as two plies, no compensation is needed in the foot, although a compensating shoe type of foot may of course be used. However, in the topstitched seam version of FIG. 16, although the work enters the stitching stations as only two plies, it emerges as one ply at the right and three plies at the left. To ensure that the presser foot cooperates fully with the feed dog to advance the work to the stitching stations, it is desirable to make the foot of the compensating shoe type. Accordingly, shank 320 supports three sections 321, 322 and 323, respectively the main, middle and right sections, which handle respectively two, three and single ply portions of the finished trouser leg seam. These sections are resiliently biased downwardly to exert pressure on their respective portions of the work, main section 321 being urged by horizontally disposed coil spring 324, and sections 322 and 323 being tensioned by hidden vertically disposed coil springs which are respectively adjusted by means of screws 325 and 326.

Main section 321 is relieved at its right side to permit passage of the front overedge needle and its associated loopers, and has clamped to its upper surface, a wire member 327 which functions in the same manner as the spirally twisted tongue of the first version to carry the overcast upper ply edge out of the path of the rear overedge elements. Main section 321 also supports a resiliently urged depressor member 328 which coacts with knife edge 402 to separate the plies. Member 328 is pivotally mounted on the right side of the forward portion of section 321 (FIG. 14), and at its lower end is provided with a small horizontally disposed platform 329 which fits into aperture 399 of the needle-plate when foot 314 is in operating position. Member 328 has an internal, elliptical vertical slot which fits about a shoulder on screw 330 to limit the vertical travel of platform 329, and leaf spring 331 fitting in the horizontal open slot at the top of member 328 normally exerts pressure to bias platform 329 downwardly a specific amount which may be adjusted to limit the amount of downward travel by a platform (hidden) under the head of screw 332 which fits through a clearance hole in spring 331. The amount of downward bias on platform 329 is adjusted so that both plies are initially urged into aperture 399 by platform 329, but as the feed draws the work rearwardly, the upper ply curls upwardly over knife edge 402 while the lower ply is directed beneath the surface of the needle-plate.

The upper ply continues over the surface of the needle-plate to the needle-hole 403 and the interaction of needle 100, and its associated loopers, causes the overcasting to form in and about the upper ply edge and also about both the short tongue 405 and wire member 327, the forward end of which is shaped to lie closely adjacent this short tongue so that the stitching may form about both. Tongue 405 is made short, and with the considerable taper mentioned, so that when it is desired to raise the foot, the overcast stitching may easily be pulled off the short tongue as the foot is raised.

Figure 19:
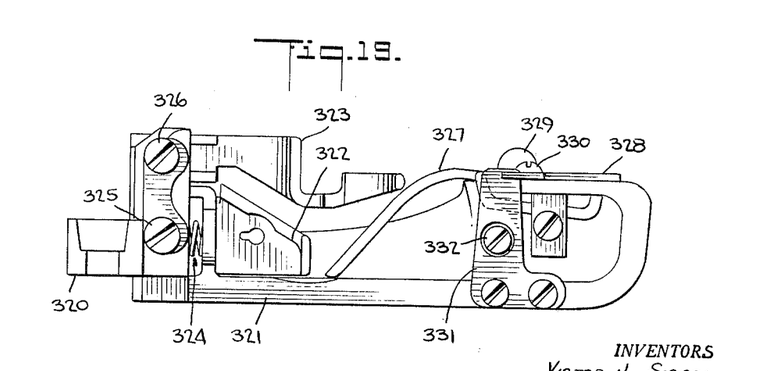
FIG. 19 is a plan view of the presser foot of the second version showing the split compensating shoe and the type of wire member used to obtain the flat seam shown in FIG. 16.
Figure 20:
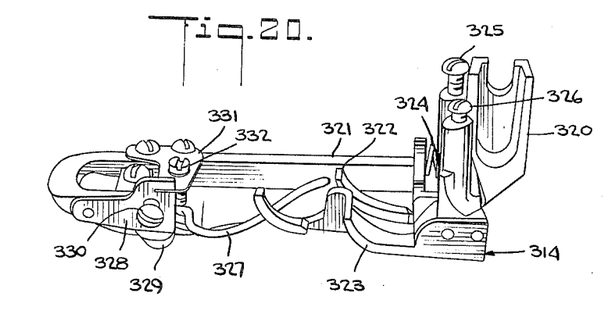
FIG. 20 is an exploded view of the presser foot and needle-plate of FIG. 18, looking from the opposite direction, in relative operating arrangement but with the needle-plate tilted upwardly to show the detail on the side and bottom more clearly.
Figure 21:
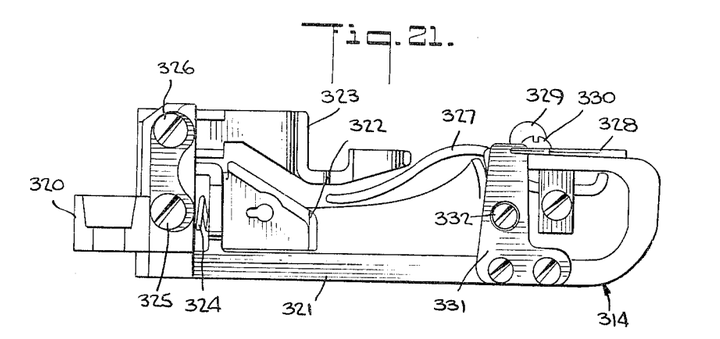
FIG. 21 is a plan view of a presser foot similar to that of FIG. 19 showing the shape of the wire member required for the type of seam shown in FIG. 1 using the equipment of FIG. 16.

Use of wire member 327 permits a ready choice of the type of finished seam which may be produced. As shown in FIG. 19, with the wire member directed to the left at the rear of the foot, the overcast edge of the upper ply is bent back upon itself and thus passes under the middle section 322 of the foot as three fabric plies to the join seaming station at which the plies are sewn together in the form of opened seam which requires no subsequent ironing, shown in FIG. 16. However, if the wire member be shaped as shown in FIG. 21, the upper ply will be led back to the right and will pass out under the bottom of the foot in the form of the seam shown in FIG. 1.

It is a matter of choice which ply diverting member is used, however, since the twisted tongue of the first version may also be used in the second version. The principle involved is that of binding the overcast edge of one of the plies, not necessarily the top ply, to a member which extends in a direction away from the region of activity of one of the overcasting stations to avoid that station as overcasting of the other ply proceeds. It is also a matter of choice whether this diverting member be mounted on the needle-plate as shown in the first version, or on the foot in the modification of the first version shown in FIG. 15, and in the second version as shown in FIG. 19. It may be appreciated that the ply diverting member might be supported from some other portion of the sewing machine as for example as part of an auxiliary front presser foot member, independent of the presser foot carried by the usual presser foot bar, supported on the machine bed in advance of the main presser foot, as in FIG. 24. This may be of advantage in obtaining better control of the plies before they reach the stitching stations. Such an arrangement may even be supported by the housing 35.

Figures 22, 23, 24:
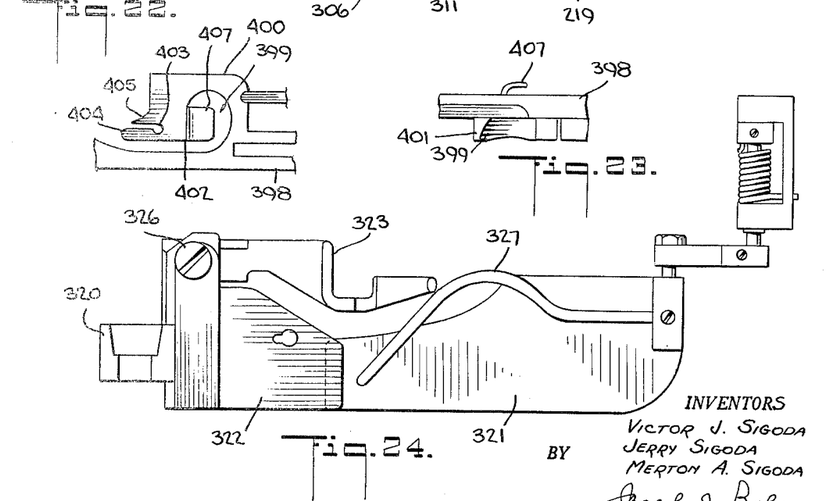
FIG. 22 is a fragmentary view of a portion of a variation of the needle-plate of the second version in which ply separation is performed by a short platform projecting above the level of the surface of the needle plate.
FIG. 23 is a fragmentary side elevation corresponding to FIG. 22.
FIG. 24 is a plan view of another variation of the presser foot in which the front portion of the foot is not supported by the foot bar.

The separation of the plies in the first version is performed by a platform spaced above the surface of the needle-plate, and in that version, the overcasting of the upper ply edge takes place on a level above that of the surface of the needle-plate. In the second version, the separation takes place mainly because of a separator knife edge disposed in the plane of the surface of the needle-plate, and overcasting of both the upper and lower ply edges takes place in the plane of the surface of the needle-plate. A variation intermediate between the first and second versions involves performing the overcasting of the edge of the upper ply in the plane of the surface of the needle-plate, but accomplishing the separation of the plies on a level above the plane of the surface of the needle-plate. This is accomplished as shown in FIGS. 22 and 23 by means of a short separator platform 407 which is attached to the knife edge 402 and extends forwardly over aperture 399 and above the level of the surface of the needle-plate at a height just enough to effect the separation of the plies. In this arrangement member 328 and its associated mechanism are not needed.

While preferred embodiments of the invention have been described in detail and certain modifications suggested, it will be understood that various other changes may be made in the several parts without departing from the general principles and the scope of the invention is therefore defined in the appended claims.

What is claimed is:

1. A unitary sewing machine for producing three distinct lines of stitching in two superposed upper and lower plies of fabric material in a single sewing operation, comprising: a single feed mechanism for transporting the plies; two overedge stitching stations each having a reciprocating needle and at least one overedge looper cooperating respectively with its own needle for separately and sequentially overcasting the edge of each of the plies; a join seam stitching station having a reciprocating needle and a cooperating looptaker for uniting the plies; said stitching stations being arranged on the sewing machine in close proximity to each other for sequential stitching of the plies; fabric cutting mechanism positioned in advance of the stitching stations for trimming both plies simultaneously so that the edges of the plies are in register; said feed mechanism acting to maintain said edges in register as the plies are fed to the stitching stations; a single common operating means for driving the stitching stations and the trimming and feed mechanism; means for temporarily separating the superposed in register plies from each other comprising a separator mounted in advance of one of the overedge sewing stations, said separator having a surface over which the upper ply is drawn to its overcasting station and a contoured undersurface under which the lower of said plies is drawn and guided out of the path of the overcasting station by the feed mechanism, means for directing the overcast ply edge out of the path of the second overcasting station as the other ply edge is being overcast at the second overcasting station; and means for guiding both of the plies to the join stitching station to be united thereat as the plies are transported through the machine by the feed mechanism.

2. A sewing machine in accordance with claim 1 in which said separator also has a stitch tongue portion which supports the edge of the upper ply as the latter is overcast and around which the overcasting stitching in the upper ply edge forms to bind said ply edge to said tongue; said tongue portion having a spiral twist along which said stitch bound upper ply travels, as the plies are drawn by the feed mechanism, to be guided away from the overedge sewing station at which the lower ply is overcast.

3. A sewing machine in accordance with claim 1 in which said sewing stations have a common needle-plate associated therewith, and in which a portion of the means for guiding said ply edges is supported by said needle-plate in advance of one of said overedge stitch sewing stations and consists of a stitch tongue which supports the edge of the upper ply as the latter is overcast and around which the overcasting stitching in the upper ply edge forms to bind said ply edge to said stitch tongue, said tongue being shaped to deflect the stitch bound upper ply edge away from a path leading to the other overedge stitch sewing station.

4. A sewing machine in accordance with claim 1 in which the sewing stations have a common needle-plate and a common presser foot associated therewith, and in which a portion of the means for guiding said ply edges is supported by said needle-plate and another portion is supported by said presser foot, and in which said needle-plate supported guide means portion includes a shaped stitch tongue which supports the edge of the upper ply as the latter is overcast and around which the overcasting stitching in the upper ply edge forms to bind said edge to said tongue, said tongue being so shaped, that as the feed mechanism draws the plies, the stitch bound upper ply edge is bent laterally and vertically away from a path leading to the other overedge stitch sewing station; and in which said presser foot supported guide means portion comprises a wall communicating with the said stitch tongue and adapted to continue the deflection of the stitch bound upper ply edge away from the other overedge stitch sewing station as the latter is overcasting the lower ply.

5. A sewing machine in accordance with claim 1 in which the means for guiding the ply edges includes a shaped stitch tongue, mounted in advance of one of said overedge sewing stations which supports the edge of one of said plies as the latter is overcast and around which the overcasting stitching forms in said ply to bind the latter to said tongue, and along which shape the stitch bound ply edge travels, as the plies are drawn by the feed mechanism, to be guided away from the overedge sewing station at which the other ply edge is overcast.

6. A sewing machine in accordance with claim 5 in which the shaped stitch tongue comprises a wire member which supports the edge of one of said plies as the latter is overcast and around which the overcasting stitching forms in said ply to bind the latter to said wire member, said wire member being so shaped, that as the plies are drawn by the feed mechanism to the stitching stations, the stitch bound ply edge is initially guided out of the path of the overedge sewing station at which the other ply edge is overcast and is then bent back upon itself as a reverse fold as said ply edge follows said wire member into the path of the join seam stitch sewing station.

7. A sewing machine in accordance with claim 5 in which the shape of said stitch tongue is such that the stitch bound ply edge travels in a path in which it is initially guided away from the overedge sewing station at which the other ply edge is overcast and then into the path of the join seaming station.

8. A sewing machine in accordance with claim 7 in which the shape of the stitch tongue is such that the stitch bound ply edge travels in a path in which it is initially guided away from the overedge sewing station at which the other ply edge is overcast and is also folded back upon itself in a reverse fold and then into the path of the join seaming station.

9. A unitary sewing machine for producing three distinct lines of stitching in two superposed upper and lower plies of fabric material in a single sewing operation, comprising: a single feed mechanism for transporting the plies; two overedge stitching stations each having a reciprocating needle and at least one overedge looper cooperating respectively with its own needle for separately and sequentially overcasting the edge of each of the plies; a join seam stitching station having a reciprocating needle and a cooperating looptaker for uniting the plies; said stitching stations being arranged on the sewing machine in close proximity to each other for sequential stitching of the plies; fabric cutting mechanism positioned in advance of the stitching stations for trimming both plies simultaneously so that the edges of the plies are in register; said feed mechanism acting to maintain said edges in register as the plies are fed to the stitching stations; a single common operating means for driving the stitching stations and the trimming and feed mechanism; a common needle-plate having a surface and a common presser foot associated with the needle-plate; means for temporarily separating the superposed in register ply edges from each other comprising a portion of the surface of the needle-plate and complementary means in the presser foot for separating the plies and for directing the lower of said plies beneath the surface of the needle-plate as the upper ply passed over the surface of the needle-plate to be overcast at its overedge station; means for directing the overcast ply edge out of the path of the second overcasting station as the other ply edge is being overcast at the second overcasting station; and means for guiding both of the plies to the join stitching station to be united thereat as the plies are transported through the machine by the feed mechanism.

10. A sewing machine in accordance with claim 9 in which said needle-plate also has a projection beneath said surface and a channel formed between said projection and said surface with a knife edge formed at the junction of said surface of said channel; and in which the means in said foot comprises a resiliently biased depressor member supported by said foot adapted to urge said plies downwardly into said channel so that said knife edge separates the plies with the upper ply passing over the surface of the needle-plate to be overcast at one of the overedge sewing stations, and the lower ply passing through said channel to be diverted from the said overedge sewing station.

11. A unitary sewing machine for producing three distinct lines of stitching in two superposed upper and lower plies of fabric material in a single sewing operation, comprising: a single feed mechanism for transporting the plies; two overedge stitching stations each having a reciprocating needle and at least one overedge looper cooperating respectively with its own needle for separately and sequentially overcasting the edge of each of the plies; a join seam stitching station having a reciprocating needle and a cooperating looptaker for uniting the plies; said stitching stations being arranged on the sewing machine in close proximity to each other for sequential stitching of the plies; fabric cutting mechanism positioned in advance of the stitching stations for trimming both plies simultaneously so that the edges of the plies are in register; said feed mechanism acting to maintain said edges in register as the plies are fed to the stitching stations; a single common operating means for driving the stitching stations and the trimming and feed mechanisms; means for temporarily separating the superposed in register plies from each other; a common needle-plate having a surface; said ply separating means including a projection beneath the surface of said needle-plate, a channel formed adjacent the junction of said projection and said surface and elevated above the plane of said surface sufficiently to permit the lower ply to pass thereunder and to pass into said channel but to cause the upper ply to pass over the surface of the needle-plate to one of the overedge stations to be overcast thereat while the under ply passes through said channel to be diverted from said overedge station and to be directed to the second of said overedge stations to be overcast thereat.

12. A sewing machine in accordance with claim 11 in which said separator edge and said projection have a continuous contour leading downwardly and laterally away from a path leading to the overedge station at which the upper ply edge is overcast to deflect the lower ply edge away from said overedge station.

13. A sewing machine in accordance with claim 11 in which said separator edge is supported on said needle-plate.

14. A sewing machine in accordance with claim 11 in which there is also a common presser foot associated with the sewing stations and in which said separator edge is supported in said presser foot above the surface of said needle-plate.

15. A sewing machine in accordance with claim 14 in which said separator edge supported on said presser foot also includes a stitch tongue about which the overcasting stitching in the edge of the upper ply forms to bind said upper ply edge to said tongue and in which said tongue is shaped to guide the stitch bound upper ply edge away from the overedge station at which the edge of the lower ply is overcast.

16. A sewing machine in accordance with claim 14 in which the presser foot is in two parts one of which is supported on the machine in advance of one of the overedge stations and which portion supports the separator edge and in which the separator edge has a portion adapted to act as a stitch tongue to support the edge of the upper ply as the latter is overcast and around which the overcasting stitching forms in the upper ply to bind said edge to said tongue, and in which said tongue is shaped to guide said stitch bound upper ply edge away from the overedge station at which the edge of the lower ply is overcast.

17. Mechanism for converting a modified single needle sewing machine for the production of three independent lines of stitching in superposed upper and lower plies of fabric material, one of which lines of stitching is a join seam and the other two of which are separate overcasting of the edges of each of the superposed plies; said mechanism including a replacement needle-plate, a replacement presser foot, two additional needles and means for mounting said needles for movement with the original needle, a housing mountable on the sewing machine, looper operating mechanism supported in said housing, and means communicating with a drive source in said sewing machine for operating said looper operating mechanism; in which at least two independently threaded, but commonly operated loopers are provided for cooperation with the two additional needles for the formation of independent overcasting over the edges of each of the plies; and in which said replacement needle plate and said replacement presser foot are provided with means for separating said plies and for guiding the edges of each of said plies in turn out of the path of the overcasting station at which the other ply edge is being overcast.

18. A needle-plate for use in a sewing machine having a join seaming station and two independent overedge sewing stations for separately and sequentially overcasting the edges of superposed upper and lower plies of fabric material; said needle-plate having a first stitch tongue for one of said overedge stations, a combined ply separator and lower ply deflector member, and means for mounting said member above the surface of said needle-plate, said member having one portion adapted to separate said plies so that the upper ply passes over the surface of said needle-plate, and the lower ply passes under the surface of said needle-plate, said member also having a spirally twisted stitch tongue which supports the edge of the upper ply as it is overcast at one of said overedge sewing stations and around which the overcasting stitching in said upper ply edge forms to bind said ply edge to said tongue to be guided away from a path leading to the other stitch tongue.

19. A presser foot for use with a sewing machine having a join seaming station and two independent overedge sewing stations for separately and sequentially overcasting the edges of superposed upper and lower plies of fabric materials, feed mechanism for drawing said plies to said sewing stations, and a needle-plate having a surface over which said plies are drawn by said feed mechanism, said needle-plate having a stitch tongue formed in said surface; said presser foot having a wire member positioned thereon so that when said presser foot is mounted on said sewing machine in position over said needle-plate the wire member communicates with the end of said stitch tongue in such arrangement that when overcasting of the edge of one of said plies takes place at the overedge station adjacent thereto, the overcasting stitching forms in said ply edge about both said stitch tongue and said wire member; said wire member being shaped so that the overcast ply edge bound thereto is guided in a path away from the other overedge sewing station as the feed mechanism draws the plies to the stitching stations.

References Cited by the Examiner

UNITED STATES PATENTS

| | | | |
|---|---|---|---|
| 1,247,072 | 11/1917 | Berger | 112—136 X |
| 2,356,663 | 8/1944 | Enos | 112—260 X |
| 2,369,026 | 2/1945 | Dasher | 112—115 X |
| 2,592,463 | 4/1952 | Phillips | 112—129 X |
| 2,973,730 | 3/1961 | Schweda et al. | 112—162 |
| 2,973,731 | 3/1961 | Sigoda | 112—162 |

FOREIGN PATENTS 1,035,688 4/1953 France.
 (Corresponding U.S. 2,704,042, Mar. 15, 1955)
 480,789 8/1929 Germany.
1,051,101 2/1959 Germany.
 13,138 1890 Great Britain.

JORDAN FRANKLIN, *Primary Examiner.*

THOMAS J. HICKEY, DAVID J. WILLIAMOWSKY,
*Examiners.*